Nov. 7, 1950 — A. HAUER — 2,529,390

CORNER TRUCK UNIT

Filed Jan. 24, 1949 — 2 Sheets-Sheet 1

INVENTOR.
Arthur Hauer
BY Myron J. Dikeman
ATTORNEY

Nov. 7, 1950     A. HAUER     2,529,390
CORNER TRUCK UNIT

Filed Jan. 24, 1949     2 Sheets-Sheet 2

INVENTOR.
Arthur Hauer
BY Myron J. Diksman
ATTORNEY

Patented Nov. 7, 1950

2,529,390

UNITED STATES PATENT OFFICE 2,529,390

CORNER TRUCK UNIT

Arthur Hauer, Detroit, Mich.

Application January 24, 1949, Serial No. 72,393

2 Claims. (Cl. 16—30)

1

The object of my invention is to produce a detachable truck unit that may be readily installed and mounted beneath the respective corners of various types of vertical wall frame assemblies, for supporting and moving same.

Another object is to provide a detachable corner truck unit adaptable for readily mounting beneath the corners of vertically assembled stage scenery panels, for supporting or rotating same on the stage at desired locations.

A further object is to provide a corner truck unit that will readily adjust to any vertical panel assembly, without attaching means, and may be easily installed or removed therefrom.

A still further object is to provide a universal corner truck unit that can readily be converted, with other units, into a rigid platform truck assembly, by use of a horizontally covered framed support.

These several objects are attained in the preferred form by the construction and arrangements of parts more fully hereinafter set forth.

Similar parts on all drawings are marked by similar numerals or letters.

In general, my invention comprises a horizontal truck base having vertical channel frame supports angularly positioned at opposite ends thereof, and provided with a single support truck caster centrally positioned therebetween, using the design for rectangular frame assembly for illustrating my invention.

Figure 2:
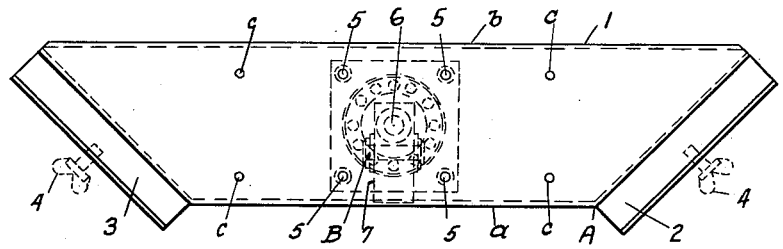
Fig. 2 is a top view of the corner truck, showing the relative position of the frame recesses, and the assembled operating parts.
Figure 1:
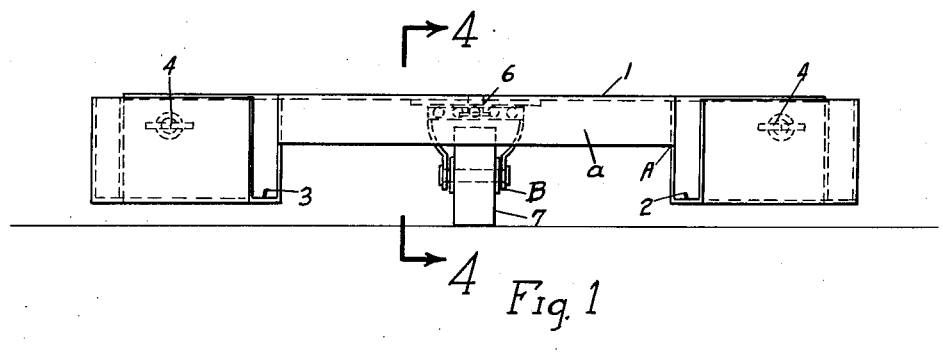
Fig. 1 is a side elevation of my corner truck unit, showing the general arrangement of the assembled parts and sections.
Figure 3:
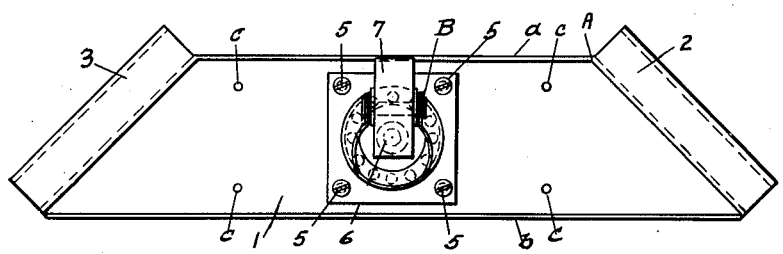
Fig. 3 is a bottom view of the assembled truck unit, showing the central swivel caster mounted thereon.
Figure 4:
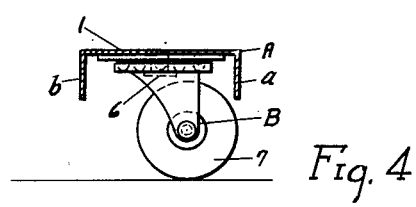
Fig. 4 is a cross-sectional view taken on the line 4—4 of the Fig. 1, showing the swivel caster construction and means for attaching same thereon.

My device is made of a combined horizontal base section A and central support caster B. The base section is preferably made of suitable sheet metal, of predetermined thickness, depending upon the truck requirements, and is formed with an elongated horizontal central section 1 formed with lower flanged stiffener edges a and b bent at right angles thereto, and is extended the full length of the base side edges. The opposite base ends are extended and designed to form open, rectangular, vertical frame support casings 2 and 3, oppositely positioned thereon at forty-five degree angles with the central section 1, thus forming a right angle between the respective support casings, (when designed for rectangular framed assemblies). If desired, special frame clamp screws 4 may be threadably mounted within the outer support casing walls, as indicated in the Figs. 1 and 2 of the drawings, for more rigidly clamping any framed assembly as may be mounted therein. The folded adjoining metal edges may be welded together by any suitable means, for forming a more rigid base construction, when greater strength is required. Mounted on the under side of the base section A, centrally located thereon, is a suitable swivel truck caster unit B, fixedly attached thereto by the screws 5, said caster preferably being of the ball bearing type, rotatable to any directional angle about its vertical supporting pivot 6. The caster B is of a suitable size and design to project its operating wheel 7 below the frame support casings 2 and 3 when in operation. Added holes c are provided for caster side adjustment when required.

Figure 5:
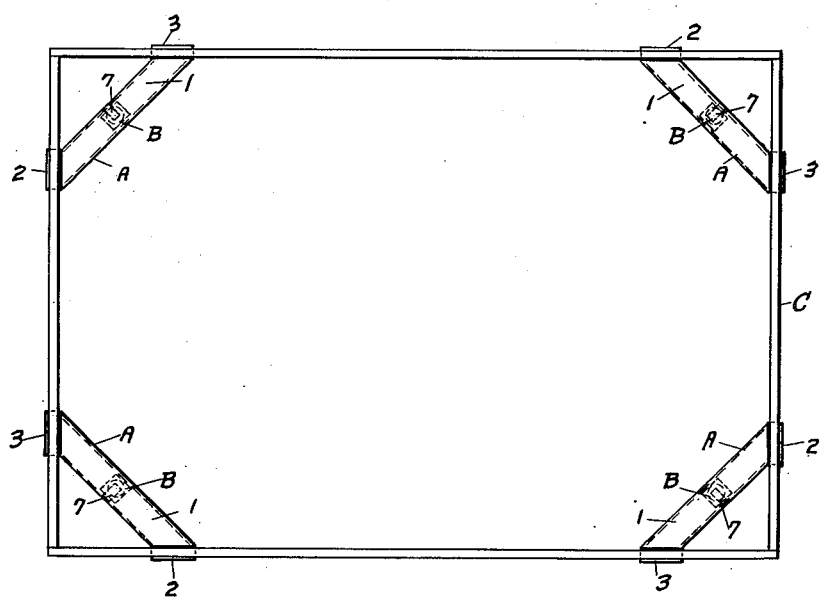
Fig. 5 is a plan view showing the respective corner truck units as mounted beneath a rectangular frame assembly, designed for converting my unit into a platform truck.

In utilizing my demountable corner truck unit beneath the respective framed assembly corners, as indicated in the Fig. 5 of the drawings, the frame C is formed of rigid, rectangular cross-section members of a size and design to enter edgewise within the respective support casings 2 and 3, when the truck unit is inserted thereunder, and rests securely therein. The frame C may be fixedly clamped within the respective casings, if desired, by means of special screws 4, for making a more rigid assembly. The truck swivel caster wheel 7, resting on the floor, carries the frame load. The frame C may be covered with sheet material when desired for use as a platform truck, or the frame C, as indicated, may represent the vertical edges of an inverted box section, or similar assemblies. The respective corner truck units A may be readily displaced and removed from their respective frame corners by lifting the frame assembly therefrom.

Figure 6:
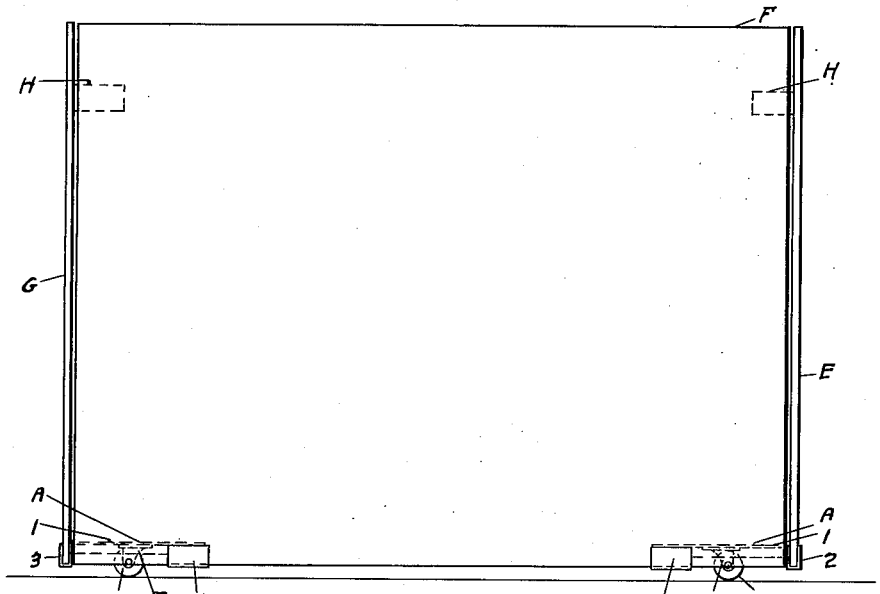
Fig. 6 is an elevation showing framed stage scenery panels, vertically assembled and mounted on the respective corner truck units, for readily interchanging, rotating or removing the scenery on the stage.

When my truck unit is applied to stage scenery sections E, F, and G, &c., as illustrated in the Fig. 6 of the drawings, said scenery panels need be joined together by some suitable means as indicated by the attached corner clamps H, to prevent shifting or tilting of the assembled vertical sections when mounted on the respective truck units. The scenery panel corner edges are entered in the truck support casings 2 and 3 in the same manner as previously described, and operate in the same way.

It is to be understood that the panel frame assembly, herein illustrated as a rectangular formation, may also be of triangular assemblies, or other similar designs, if desired, and the respective corner truck support casing units adjusted to the proper predetermined angles, as required. The application and operation is exactly the same as previously described.

Having fully described my corner truck unit, what I claim as my invention and desire to secure by Letters Patent is:

1. A corner truck unit of the character described adapted for mounting beneath framed vertical panel section assemblies, for use therewith, comprising an elongated sheet metal base section formed with flanged edges along opposite sides thereof and with open, vertical frame support casings at opposite ends thereof, positioned at opposing predetermined horizontal angles therewith, a swivel truck caster mounted beneath the base central section and securely attached thereto, said caster wheel being of a size to project its lower edge below the respective end support casings.

2. A corner truck unit of the character described adapted for mounting beneath framed vertical panel sections, for use therewith, comprising an inverted channel sheet metal base section, and formed with open, vertical, rectangular shaped support casings at opposite ends thereof, positioned at opposing predetermined horizontal angles therewith and projected below said central base section surface, a swivel truck caster fixedly mounted beneath the base central section and attached thereto, positioned with said caster wheel projected below the respective support casing bottoms, and means mounted on said support casing walls for rigidly clamping vertical members therein.

ARTHUR HAUER.

REFERENCES CITED

The following references are of record in the file of this patent:

UNITED STATES PATENTS

| Number | Name | Date |
|---|---|---|
| 835,492 | Baker | Nov. 13, 1906 |
| 1,130,684 | Brown | Mar. 2, 1915 |
| 2,049,344 | Wittke | July 28, 1936 |
| 2,175,317 | Rogers | Oct. 10, 1939 |

FOREIGN PATENTS

| Number | Country | Date |
|---|---|---|
| 339,189 | Great Britain | Dec. 4, 1930 |